US008984151B1

(12) United States Patent
Hsieh et al.

(10) Patent No.: US 8,984,151 B1
(45) Date of Patent: Mar. 17, 2015

(54) CONTENT DEVELOPER ABUSE DETECTION

(71) Applicant: Google Inc., Mountain View, CA (US)

(72) Inventors: Sheng Chi Hsieh, Taipei (TW); Nicolaus Todd Mote, Los Angeles, CA (US); Sharon Lee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/759,712

(22) Filed: Feb. 5, 2013

(51) Int. Cl.
*G06F 15/16* (2006.01)
*H04L 12/24* (2006.01)

(52) U.S. Cl.
CPC ............................... *H04L 41/28* (2013.01)
USPC ........... 709/229; 709/203; 709/219; 709/223; 709/224; 726/5; 726/27

(58) Field of Classification Search
USPC ......... 709/203, 219, 223, 225, 229, 204, 224; 706/12, 48; 726/5, 27
See application file for complete search history.

(56) References Cited

U.S. PATENT DOCUMENTS

| 7,092,926 | B2* | 8/2006 | Cerrato | 706/48 |
|---|---|---|---|---|
| 7,631,362 | B2* | 12/2009 | Ramsey | 726/27 |
| 8,572,736 | B2* | 10/2013 | Lin | 726/23 |
| 8,590,021 | B2* | 11/2013 | Steeves et al. | 713/168 |
| 2002/0002605 | A1* | 1/2002 | Honda | 709/219 |
| 2002/0178257 | A1* | 11/2002 | Cerrato | 709/224 |
| 2005/0025172 | A1* | 2/2005 | Frankel | 370/437 |
| 2005/0203881 | A1* | 9/2005 | Sakamoto et al. | 707/3 |
| 2006/0242424 | A1* | 10/2006 | Kitchens et al. | 713/183 |
| 2007/0067853 | A1* | 3/2007 | Ramsey | 726/28 |
| 2007/0094208 | A1* | 4/2007 | Cerrato | 706/48 |
| 2009/0196465 | A1* | 8/2009 | Menon | 382/118 |
| 2009/0264138 | A1* | 10/2009 | Kang et al. | 455/466 |
| 2009/0288150 | A1* | 11/2009 | Toomim et al. | 726/5 |
| 2010/0146622 | A1* | 6/2010 | Nordstrom et al. | 726/23 |
| 2010/0153521 | A1* | 6/2010 | Lor et al. | 709/219 |
| 2011/0061099 | A1* | 3/2011 | Jiang et al. | 709/225 |
| 2011/0066652 | A1* | 3/2011 | Piepenbrink et al. | 707/783 |
| 2011/0113147 | A1* | 5/2011 | Poluri et al. | 709/229 |
| 2011/0145070 | A1* | 6/2011 | Wolinsky et al. | 705/14.61 |
| 2011/0191418 | A1* | 8/2011 | Yang et al. | 709/204 |

(Continued)

OTHER PUBLICATIONS

Chandy et al., "Identifying Spam in the iOS App Store," Web Quality '12, Apr. 16, 2012, Lyon, France.

(Continued)

*Primary Examiner* — Ramy M Osman
(74) *Attorney, Agent, or Firm* — Morris & Kamlay LLP

(57) ABSTRACT

A server that manages download and/or distribution of content may collect content-related information associated with users, and classify the users based on that data. The content-related information may comprise data relating to content generation and/or upload by the users. The server may determine whether a user is granted permission to upload content for distribution or download via the server, based on correlating the user with a previously classified user, and/or on evaluation of current content generation or download activities associated with the user. Determination of whether the user is granted permission to upload content may be done directly and/or autonomously by the server. Alternatively, a recommendation whether to grant permission to upload content may be submitted by the server to another entity for selection thereby. The server may reject or accept a content upload request from the user based on the determination of whether the user is granted permission.

18 Claims, 4 Drawing Sheets

(56) References Cited

U.S. PATENT DOCUMENTS

| | | |
|---|---|---|
| 2011/0239273 A1* | 9/2011 | Yang et al. .................... 726/3 |
| 2012/0046068 A1* | 2/2012 | Katpelly et al. ........... 455/550.1 |
| 2012/0101970 A1 | 4/2012 | Zernik et al. |
| 2012/0117473 A1* | 5/2012 | Han et al. .................... 715/723 |
| 2012/0124067 A1 | 5/2012 | Liu et al. |
| 2012/0246737 A1* | 9/2012 | Paxton et al. ................ 726/27 |
| 2012/0296909 A1* | 11/2012 | Cao et al. .................... 707/737 |
| 2012/0310980 A1* | 12/2012 | Hepper ........................ 707/776 |
| 2013/0024294 A1* | 1/2013 | Joo et al. ..................... 709/204 |
| 2014/0195929 A1* | 7/2014 | Crocker et al. ............... 715/753 |

OTHER PUBLICATIONS

Lockheimer, Hiroshi, "Google Mobile Blog, Android and Security," http://googlemobile.blogspot.com/2012/02/andorid-and-security.html, Sep. 6, 2012, p. 1-8.

* cited by examiner

CONTENT DEVELOPER ABUSE DETECTION

TECHNICAL FIELD

Aspects of the present application relate to distribution of content. More specifically, certain implementations of the present disclosure relate to content developer abuse detection.

BACKGROUND

Various types of electronic devices are commonly used nowadays. In this regard, electronic devices may be used by one or more users, for various purposes, both business and personal. Electronic devices may be mobile or non-mobile, may support communication (wired and/or wireless), and/or may be general or special purpose devices. Examples of electronic devices comprise handheld mobile devices (e.g., cellular phones, smartphones, and/or tablets), computers (e.g., laptops, desktops, and/or servers), and/or other similar devices. In some instances, electronic devices may include applications that may be run in the electronic devices. In this regard, some applications may simply be intended for recreational use (e.g., games), while other applications may be intended for personal or business use (e.g., shopping, purchases, banking, scheduling, navigation, etc.). In some instances, electronic devices may come with pre-installed applications. In other instances, applications may be downloaded (e.g., via the web) and installed in the electronic devices.

Further limitations and disadvantages of conventional and traditional approaches will become apparent to one of skill in the art, through comparison of such approaches with some aspects of the present method and apparatus set forth in the remainder of this disclosure with reference to the drawings.

BRIEF SUMMARY

A system and/or method is provided for content developer abuse detection, substantially as shown in and/or described in connection with at least one of the figures, as set forth more completely in the claims.

These and other advantages, aspects and novel features of the present disclosure, as well as details of illustrated implementation(s) thereof, will be more fully understood from the following description and drawings.

DETAILED DESCRIPTION

Figure 1:
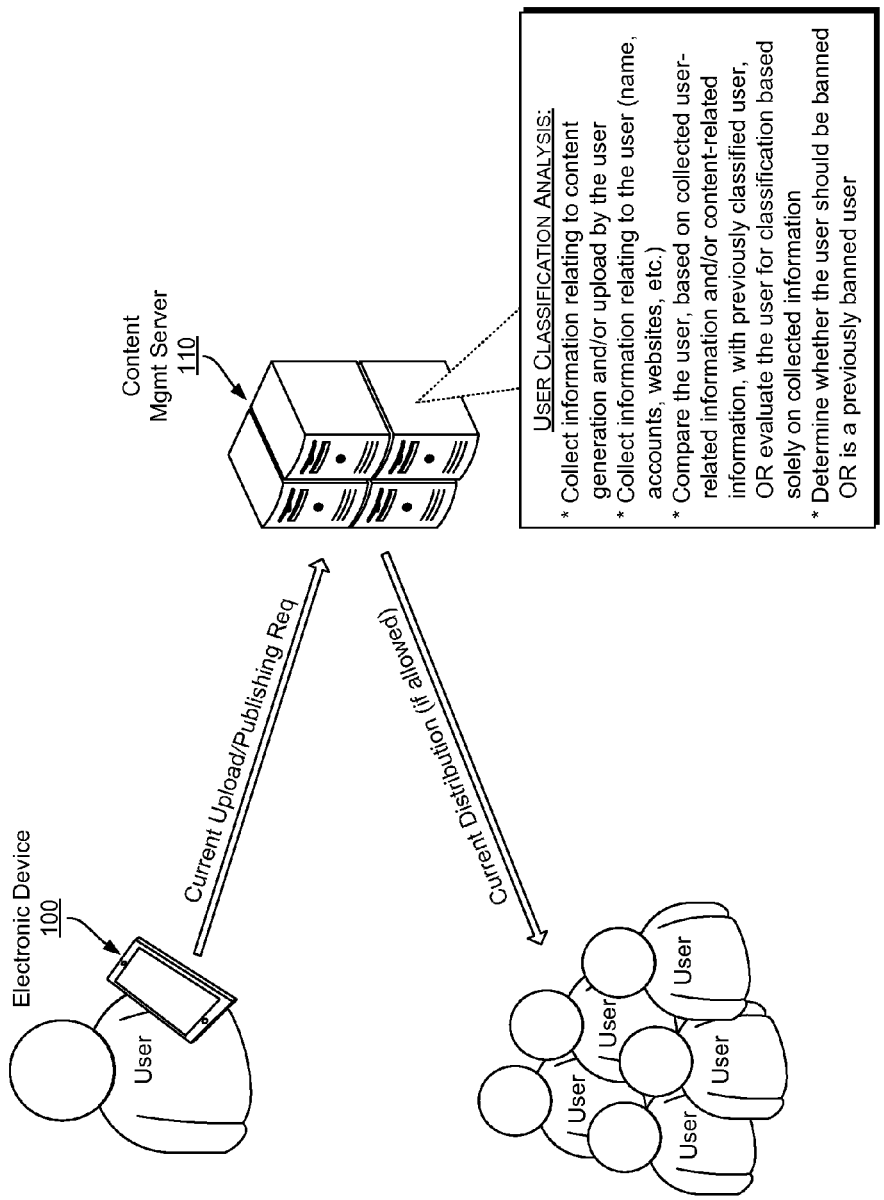
FIG. 1 is a block diagram illustrating interactions between a user, using an electronic device, and a content management server that may be configured for content developer abuse detection.

The present disclosure relates to a method and system for content developer abuse detection. In various implementations, a server system that manages distribution of content, may obtain content-related information associated with a user, where the content-related information may comprise data relating to content generation and/or upload by the user. The server system may then determine whether the user is granted permission to upload content for distribution or download via the server system, where the determining may be based on: correlating the user with a previously classified user based on previous content generation and/or download activities, or evaluating current content generation and/or download activities associated with the user. Based on the determination of whether the user is granted permission to upload content, the server system may reject or accept a content upload request received from the user. The content-related information comprises: data relating to classification of content associated with user as violating one or more applicable content distribution policies, data relating to banning of content associated with the user by one or more other users, data relating to the user or to activities of the user associated with generating or publishing of content, data relating to one or more accounts associated with the user used in generating or publishing content, data relating to identification of other accounts associated with the user, and/or market related data pertaining to content associated with the user.

The server system may correlate the user with the previously classified user based on identifying the user as the previously classified user or as being different than the previously classified user. In this regard, the server system may correlate the user with the previously classified user based on comparison of parameters associated with the user or with one or more accounts relating to the user with corresponding parameters associated with the previously classified user or with one or more accounts relating to the previously classified user. The server system may determine an outcome of at least some of the comparisons performed thereby, based on one or more preconfigured matching thresholds. The server system may evaluate current content generation and/or download activities associated with the user based on a determination of whether the current content generation and/or download activities meet a user classification criteria or threshold.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "block" and "module" refer to functions than can be performed by one or more circuits. As utilized herein, the term "e.g.," introduces a list of one or more non-limiting examples, instances, or illustrations. As utilized herein, the term 'server' may refer to a plurality of machines, at least some of which may be installed in different locations, and each of which may be utilized to implement distinct and/or redundant functions associated with operations attributed to and/or performed by the server.

FIG. 1 is a block diagram illustrating interactions between a user, using an electronic device, and a content management server that may be configured for content developer abuse detection. Referring to FIG. 1 there is shown an electronic device 100 and an content management server 110.

The electronic device 100 may comprise suitable circuitry, interfaces, logic, and/or code for performing functions or operations, and/or for running applications and/or programs. In this regard, operations, functions, applications and/or programs supported by the electronic device 100 may be performed, executed and/or run based on user instructions and/or pre-configured instructions. Accordingly, the electronic device 100 may comprise components or subsystems for enabling interactions with users, such as to obtain user input and/or to provide user output. In some instances, the electronic device 100 may support communication of data, such as via wired and/or wireless connections, in accordance with one or more supported wireless and/or wired protocols or standards. In some instances, the electronic device 100 may be a handheld mobile device—i.e., be intended for use on the move and/or at different locations. In this regard, the electronic device 100 may be designed and/or configured to allow for ease of movement, such as to allow it to be readily moved while being held by the user as the user moves, and the electronic device 100 may be configured to perform at least some of the operations, functions, applications and/or programs supported by the device on the move. Examples of electronic devices comprise handheld mobile devices (e.g., cellular phones, smartphones, and tablets), personal computers (e.g., laptops or desktops), servers, and/or other similar devices. The disclosure, however, is not limited to any particular type of electronic devices.

The content management server 110 may comprise suitable circuitry, interfaces, logic, and/or code for centrally managing applications that may be made available (e.g., for download and/or distribution) to electronic devices, such as the electronic device 100. In this regard, the content management server 110 may be associated with an entity offering applications for download (free or by-purchase) to the electronic device 100. Such entities may comprise physical entities and/or logical entities. Examples of entities offering applications for download may comprise online application stores, content or service providers, and the like. The disclosure, however, is not limited to any particular type of application offering entity. The content management server 110 may comprise a dedicated processing system or general purpose system that is configured for use as centralized application manager (e.g., a dedicated server or a PC programmed to provide the application management functions described in this disclosure). In some instances, an application manager 'server' may actually comprise a plurality of machines, at least some of which may be installed in different locations, and each of which may be utilized to implement distinct or redundant functions associated with application management operations as described in the present disclosure.

In operation, the electronic device 100 may be used to run or execute various functions, programs and/or applications, such as based on pre-configured instructions and/or real-time user instructions or interactions. In this regard, various types of functions, programs and/or applications may be available in the electronic device 100. For example, some functions, programs and/or applications may be intended for recreational use (e.g., games), while others may be intended for personal use (e.g., shopping, purchases, and banking), or for business/commercial use (e.g., scheduling, and remote access). The functions, programs and/or applications available in the electronic device 100 may require varying amounts of user interactivity—e.g., some may require constant and/or continuous user interaction, such as games, chats, or call applications; while others may only require infrequent user interactions, such as email applications.

In some instances, some of the functions, programs and/or applications available in electronic device 100 may be pre-installed on the device. In other instances, however, functions, programs and/or applications may be obtained and/or installed (e.g., by the user of the device) in the electronic device 100. For example, applications may be downloaded (e.g., via Internet connection, over a wired or wireless link) into the electronic device 100, and may be installed therein. The applications may be offered for download (free or by-purchase) by, for example, centralized content distributers (e.g., online application stores, content or service providers, and similar entities), using content distribution systems or platforms (e.g., the content management server 110) to handle the actual activities relating to distributing of content (e.g., handling user requests, storage of distributed content, and/or communication of content or information relating thereto). More recently, content distributed in this manner has more often comprised 'applications' that are configured to run, in particular, on such devices as smartphones, tablets, and the like. In this regard, with explosive growth in the use of such devices, applications that are configured to run on these devices are becoming more ubiquitous, with many centralized content distributers offering nowadays thousands and millions of applications—with some estimates suggesting tens of billions of downloads to date.

With the rapid growth of the application distribution marketplace (especially applications or other content offered to mobile devices), application development has become a very profitable business, drawing large amount of resources from developers and investors. In this regard, while many applications offered and/or made available by centralized content distributers are developed by professional entities (e.g., application or software development companies), in many instances centralized content distributers may offer applications or other content that may be developed by individual users. For example, a user of the electronic device 100 may develop applications or content, using the electronic device 100 (or another device or system) for example. The user may then attempt to offer and/or provide the developed applications or content to other users, such as users associated with and/or using the content management server 110. In this regard, the user of the electronic device 100 may communicate the developed applications and/or content to the content management server 110, which in turn may avail these applications and/or content to the other users.

The popularity of applications and the widespread and relative ease of application distribution have created enormous incentives for developers to push applications in general, and in particular applications (or other content) that may be undesirable and/or which may be used to the detriment of the end users (e.g., containing graphic or adult content, spam, advertisement, having embedded malicious code such as malware, etc.). Furthermore, in some instances, developers attempting to push through such content may utilize questionable practices. Accordingly, in various implementations of the present disclosure, centralized content distribution systems may be configured to obtain data relating to conduct of users, especially users who upload content for distribution through the systems, to ensure compliance with defined and/or applicable policies, and/or to handle or address any violations of such policies. In this regard, centralized content distribution systems may adopt and/or apply particular policies to content and/or distribution thereof.

For example, centralized content distribution systems (e.g., the content management server 110) may be configured to implement content distribution policies aimed at preventing distribution of particular content (e.g., content containing graphic material, or content identified as containing malicious code), limit distribution of content containing particular type of information (e.g., advertisement), and/or to control access to particular content (e.g., impose age-restriction on access to content containing adult material). Accordingly, the centralized content distribution systems may then obtain data relating to conduct of users, especially with respect to uploading of content for distribution through the systems, and may examine or analyze that data to determine whether the users comply with the applicable policies. Furthermore, the content distribution systems may be configured to handle or address any violations of such policies and/or any users identified as violators of these policies. In this regard, centralized content distribution systems may restrict and/or prohibit, in some instances, based on analysis of data relating to users' conduct and/or actions, certain developers who may consistently violate applicable policies from submitting content and/or distributing content through the system to other users.

In some instances, users may attempt to circumvent any applicable restrictions or prohibitions on upload or distribution of content originating from them by utilizing various means to trick the centralized content distribution system. For example, developers may sometimes create alternate accounts whenever an account the developer uses gets banned in accordance with applicable policies. Accordingly, in an implementation, centralized content distribution systems (e.g., the content management server 110) may be configured to implement particular measures that may enable identifying users seeking to hide their identities, for example in order to gain access to the centralized content distribution systems and/or to obtain authorization to upload content despite being previously prohibited from doing so.

For example, the content management server 110 may be configured to support implementation of an end-to-end pipeline which may automatically identify developers who may engage in questionable practices with respect to upload and distribution of content (e.g., applications). The content management server 110 may then automatically ban those identified developers from any upload activities, and/or may submit those identified developers to another entity (e.g., another server system or human operators), who may make the ultimate determination of whether to ban those users or not. In some instances, identification of such 'bad' developers may be triggered by indications of particular change(s) in certain developer related information (e.g., change in statue, update of account information, registering new account, or mere submission of new content). The user (or conduct thereof) related information may comprise various types of information, and/or may be obtained (e.g., by the content management server 110) from various sources. For example, the content management server 110 may be configured to obtain and/or gather information relating to quantity of content (e.g., number of applications) per developer that may be classified as violating applicable policies (e.g., containing adult-only material, pertaining to particular activities such as gambling or hate-speech, involving particular unlawful actions, such as copyright-infringement, and/or containing harmful data, such as malware); information relating to quantity of content (e.g., number of applications) per developer that have been banned by the reviewers; information relating to the developer (e.g., developer's webpage, in-market rating of the apps, age-of-account); information relating to developer activity (e.g., number of applications published in certain time, application publishing and un-publishing patterns); information obtained from systems that are configured particularly to identify accounts that may be 'bad' based on having particular characteristics (e.g., based on the account's IP address, login location, etc.); information relating to accounts that may be associated with particular developers based on known account associated with those developers (e.g., based on IP address, credit card information, etc.); and/or information derived from existing content (e.g., market metadata about a developer's application, comprising, for example, a number of applications that have both low user rating and high install counts).

Once the developer related information is gathered or obtained, that information may be analyzed (e.g., by the content management server 110) to determine whether the corresponding developer may be properly identified and/or classified (e.g., as 'bad' developer). In this regard, various considerations, factors, and/or thresholds may be used (being configurable and/or adjustable) in such analysis. For example, an analysis of developer related information may be based on one or more of: determination of whether a developer account is sufficiently similar to an already-known 'bad' account (e.g., by comparing the account of currently analyzed developer with the account of the already-known 'bad' developer, for sufficient similarly, based on such account parameters as developer name, developer website, icon, and/or IP address); determination of whether the developer account is sufficiently similar (or dissimilar—e.g., to guard against attempts to impersonate other developer(s), especially popular one(s), which may attempted in order to phish user's data or steal publicity) to an already-known 'good' account (e.g., by comparing the account of the currently analyzed developer with the account of the already-known 'good' developer, for sufficient similarly or dissimilarity, based on such account parameters as developer name, developer website, icon, and/or IP address); determination of whether the developer's current portfolio (i.e., content already associated with the developer) is bad enough that the account should be banned directly; or determination of whether the developer's activities sufficiently indicates that this developer may be a 'bad' developer (e.g., a new account uploads a lot of apps in a short period).

Figure 2:
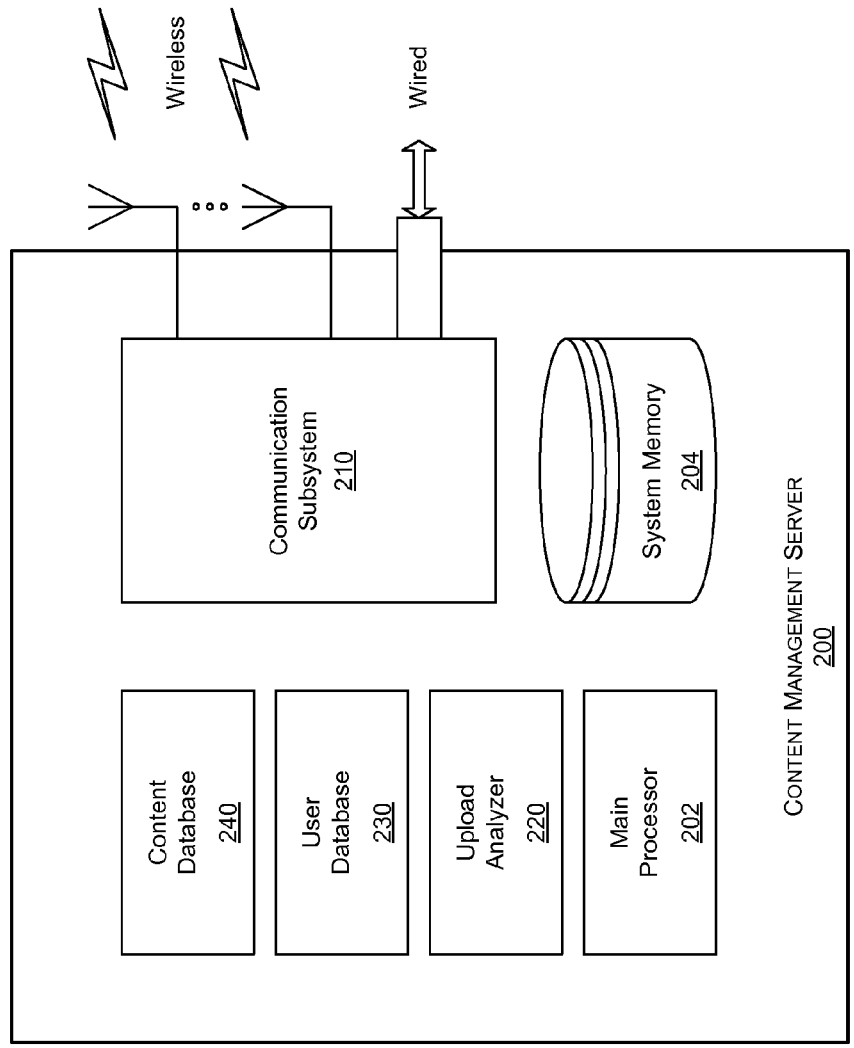
FIG. 2 is a block diagram illustrating a content management server that may be configured for content developer abuse detection.

FIG. 2 is a block diagram illustrating a content management server that may be configured for content developer abuse detection. Referring to FIG. 2 there is shown an application management server 200.

The application management server 200 may comprise suitable circuitry, interfaces, logic, and/or code operable to implement various aspects of the disclosure. In this regard, the application management server 200 may correspond to the content management server 110 of FIG. 1, for example. The application management server 200 may comprise, for example, a main processor 202, a system memory 204, a communication subsystem 210, an upload analyzer 220, a content database module 230, and a user database module 240.

The main processor 202 may comprise suitable circuitry, interfaces, logic, and/or code that may be operable to process data, and/or control and/or manage components, operations or functions of the application management server 200, and/or tasks performed therein. In this regard, the main processor 202 may configure and/or control operations of various components and/or subsystems of the application management server 200, by utilizing, for example, one or more control signals.

The system memory 204 may comprise suitable circuitry, interfaces, logic, and/or code that may enable permanent and/or non-permanent storage, buffering, and/or fetching of data, code and/or other information, which may be used, consumed, and/or processed. In this regard, the system memory 204 may comprise different memory technologies, including, for example, read-only memory (ROM), random access memory (RAM), Flash memory, solid-state drive (SSD), and/or field-programmable gate array (FPGA). The system memory 204 may store, for example, configuration data, which may comprise parameters and/or code, comprising software and/or firmware.

The communication subsystem 210 may be substantially similar to the communication subsystem 210 of FIG. 2 for example. In this regard, the communication subsystem 210 may comprise suitable circuitry, interfaces, logic, and/or code for enabling communicate data or messages from and/or to the application management server 200, via wired and/or wireless connections for example.

The upload analyzer 220 may comprise suitable circuitry, interfaces, logic, and/or code for processing and/or analyzing content uploads to the application management server 200. In this regard, the upload analyzer 220 may be configured to process or analyze application related information, which may be received by the application management server 200 from clients (e.g., electronic devices, such as the electronic device 100 of FIG. 1).

The content database module 230 may comprise suitable circuitry, interfaces, logic, and/or code for managing, controlling, and/or utilizing a content database which may be maintained in the application management server 200. In this regard, the application database may comprise information corresponding to content (e.g., applications) that may be made available to a plurality of users (e.g., for download or distribution) through the application management server 200. For example, the application database may comprise a plurality of entries, each corresponding to a particular application, with each entry comprising information pertinent to the particular application.

The user database module 240 may comprise suitable circuitry, interfaces, logic, and/or code for managing, controlling, and/or utilizing a user database which may be maintained in the application management server 200. In this regard, the user database may comprise information corresponding to a plurality of users associated with the application management server 200. For example, the user database may comprise a plurality of entries, each corresponding to a particular user, with each entry comprising information pertinent to the particular user. In some instances, each user entry may comprise a 'ban' flag, which may be asserted when the corresponding user is identified as user that banned from uploading content (e.g., applications) to the application management server 200 for distribution thereby.

In operation, the application management server 200 may be configured to implement policies relating to distribution of applications, and/or to ensure compliance with these policies, substantially as described with respect to FIG. 1. In this regard, the application management server 200 may be configured to identify applications and/or users (e.g., application developers) violating the applicable polices, and may then ban any such users and/or prevent distribution of any such applications (or, alternatively, may submits identified applications and/or user to another entity, such as human operators, for determination thereby with respect to the banning or barring of distribution). Furthermore, the application management server 200 may be configured to identify users attempting to circumvent any applicable restrictions or prohibitions on upload or distribution of content originating from them (e.g., existing ban on content uploads thereby). In this regard, the application management server 200 may be configured to implement particular measures that may enable identifying users seeking to hide their identities, in attempt to, for example, gain access to the application management server 200 and/or to obtain authorization to upload content despite being previously prohibited from doing so, substantially as described with respect to FIG. 1.

For example, the application management server 200 may utilize the user database module 240, to store information related to users associated with the application management server 200. The user information may comprise, for example, information relating to the user and/or to content related activities (e.g., development, upload, and/or download). The user information may be obtained and/or gathered in different manners and/or from different sources. For example, the user content-related information may only be obtained in conjunction with content-related interactions with the application management server 200 (e.g., when sending content upload or download requests). In instances, however, information may be gather continuously and/or may be obtained whenever available independent of user interactions with the application management server 200. The user related information may be utilized in making a determination with respect to the users. For example, user related information maintained in the user database module 240 may be utilized in identifying 'bad' developers—that is users developing (or suspected of developing) content (e.g., application) that violate applicable policies implemented via the application management server 200. In this regard, identification of 'bad' developers may be triggered by or be based on certain developer related information and/or changes thereto. For example, user related information that may be stored in the user database module, and used in determining whether a user should be banned or not, may relate to a number of applications (per user) that may be classified as violating applicable policies; information relating to number of applications (per user) that have been banned by the reviewers; information relating to the user him/herself (e.g., developer's webpage, in-market rating of the applications, age-of-account); and/or information relating to user activities, particular application related activities (e.g., number of applications published in certain time, application publishing and un-publishing patterns). In some instances, user related information may also comprise information specifically tailored for use in identify accounts that may be 'bad' such as based on particular characteristics (e.g., account's IP address, login location, etc.); information particularly recognized as being pertinent in identifying accounts that may be associated with particular users based on known account associated with those users (e.g., based on IP address, credit card information, etc.); and/or information derived from existing applications (e.g., market related data, such as per user number of applications having particular ranking or installation statistics). Once the developer related information is gathered or obtained, that information may be analyzed (e.g., by the application management server 200) to determine whether a particular user may be properly identified and/or classified (e.g., as 'bad' developer), substantially as described with respect to FIG. 1.

Implementing applicable policies may also comprise dynamic handling of each application upload, to ensure compliance with these policies. For example, whenever a content (e.g., application) upload request is received (via the communication subsystem 210), the application management server 200 may analyze (via the upload analyzer 220) the uploaded application to determine whether it (or its developer) violate applicable policies. In this regard, the analysis may comprise, as an initial step, determining if the user associated with the uploaded application is (or sufficiently matches) a previously banned user. For example, account information (e.g., user name, user website, icon, IP address, etc.) of the user associated with uploaded application may be compared with existing entries in the user database module 240, to determine, for example, if the account information sufficiently match to an already-known 'bad' account, or sufficiently match (or is sufficiently distinct from) already-known 'good' account (to guard against attempts to impersonate other developer(s), especially popular one(s), which may attempted as in order to phish user's data or steal publicity). In instances where there is sufficient match (or mismatch), a determination to reject the uploaded application may be made. In some instances, such as when there is no correlation between the current user and previously classified user, the application management server 200 may analyze (via the upload analyzer 220) current information relating to the user, which may be pertinent to the determination of rejecting or allowing new application uploads. For example, the application management server 200 may determine whether to allow or reject an application upload by a user (and/or directly ban that user) whose information does not correlate to any known (classified) user based on analysis of the user's current application portfolio (i.e., application(s) already known to be associated with the user, such as based on information available in the content database 240), and/or of user activities that may be deemed sufficiently pertinent (e.g., use of a new account to uploads a lot of applications in a short period may be interpreted as indicative of 'bad' behavior).

Figure 3:
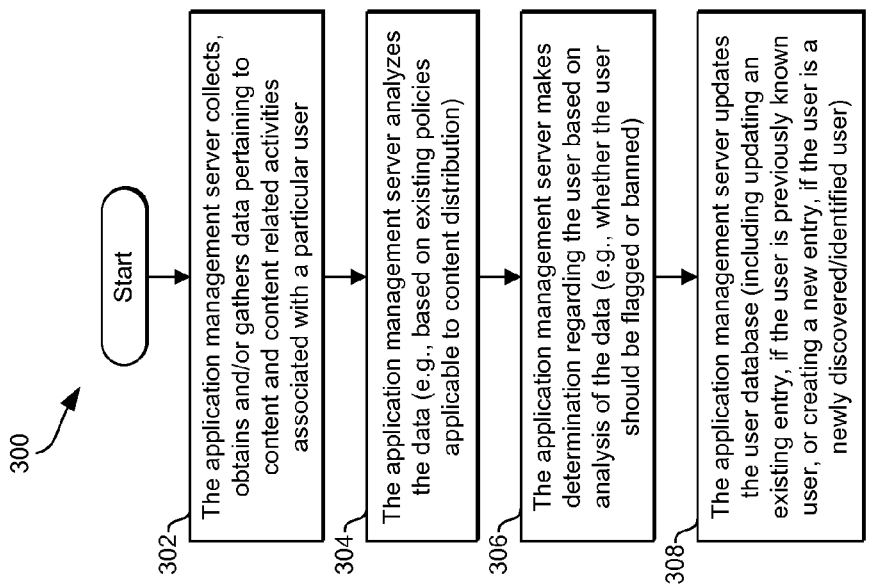
FIG. 3 is a flow chart that illustrates use of user or content related data for classifying users.

FIG. 3 is a flow chart that illustrates use of user or content related data for classifying users. Referring to FIG. 3, there is shown a flow chart 300 comprising a plurality of steps for gathering data relating to users and/or content developed thereby, and using that data for classifying the users.

In step 302, a centralized content distribution system (e.g., the application management server 200 of FIG. 2) may collect, obtain and/or gather data pertaining to content and content related activities associated with a particular user. In step 304, the application management server may analyze the data (e.g., based on existing policies applicable to content distribution). In step 306, the application management server may make a determination regarding the user based on analysis of the data (e.g., whether the user should be flagged or banned). In step 308, the application management server may update the user database (including updating an existing entry, if the user is previously known user, or creating a new entry, if the user is a newly discovered/identified user.

Figure 4:
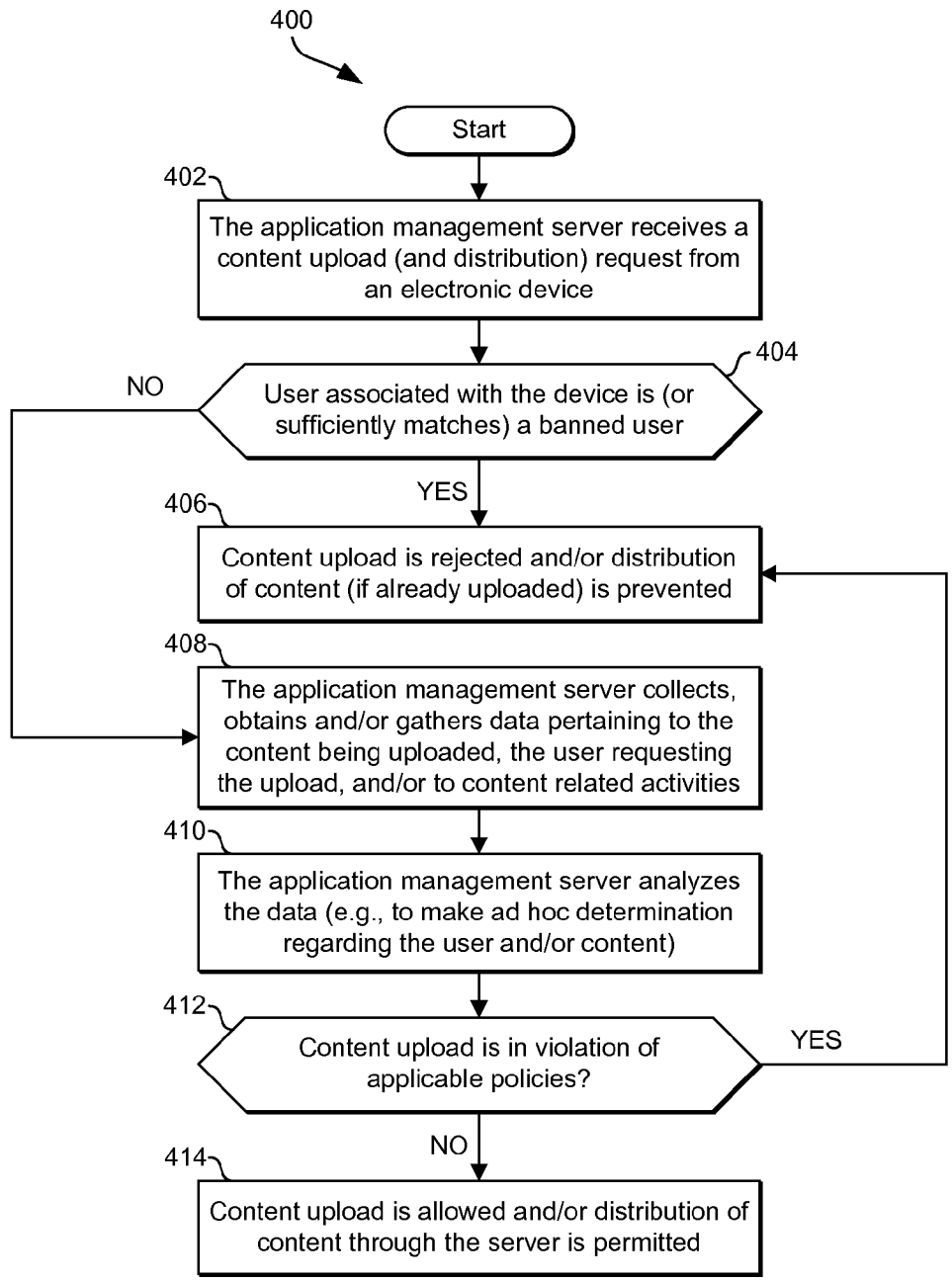
FIG. 4 is a flow chart that illustrates content developer abuse detection.

FIG. 4 is a flow chart that illustrates content developer abuse detection. Referring to FIG. 3, there is shown a flow chart 400 comprising a plurality of steps for providing content developer abuse detection and/or prevention in a centralized content distribution system (e.g., application management server 200 of FIG. 2).

In step 402, the application management server may receive a content upload (and distribution) request from an electronic device (e.g., electronic device 100 of FIG. 1). In step 404, it may be determined whether a user associated with the uploaded content and/or the device used to send the content upload is (or sufficiently matches) a previously banned user. In instances where it may be determined that the current user is (or sufficiently matches) a previously banned user, the process may proceed to step 406. In step 406, the received content upload request may be rejected and/or distribution of content (if already uploaded) is prevented.

Returning to step 404, in instances where it may be determined that the current user is not (or does not sufficiently match) a previously banned user, the process may proceed to step 408. In step 408, the application management server may collect, obtain and/or gather data pertaining to the content being uploaded, the user requesting the upload, and/or to content related activities. In some instances, at least some of this may be previously and/or continuously obtained (rather than being obtained only after receiving a content upload request). In step 410, the application management server may analyze the data (e.g., to make an ad hoc determination regarding the user and/or content—i.e., whether to ban the user and/or to reject the content). In step 412, it may be determined whether the uploaded content (and/or user or user activities) violates applicable policies. In instances where it may be determined that the uploaded content (and/or user or user activities) violates applicable policies, the process may loop to step 406. In instances where it may be determined that the uploaded content (and/or user or user activities) violates applicable policies, the process may proceed to step 414. In step 414, the received content upload request may be accepted, and upload of the content (and distribution thereof through the server) may be permitted.

Other implementations may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for content developer abuse detection.

Accordingly, the present method and/or system may be realized in hardware, software, or a combination of hardware and software. The present method and/or system may be realized in a centralized fashion in at least one computer system, or in a distributed fashion where different elements are spread across several interconnected computer systems. Any kind of computer system or other system adapted for carrying out the methods described herein is suited. A typical combination of hardware and software may be a general-purpose computer system with a computer program that, when being loaded and executed, controls the computer system such that it carries out the methods described herein.

The present method and/or system may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present method and/or apparatus has been described with reference to certain implementations, it will be understood by those skilled in the art that various changes may be made and equivalents may be substituted without departing from the scope of the present method and/or apparatus. In addition, many modifications may be made to adapt a particular situation or material to the teachings of the present disclosure without departing from its scope. Therefore, it is intended that the present method and/or apparatus not be limited to the particular implementations disclosed, but that the present method and/or apparatus will include all implementations falling within the scope of the appended claims.

What is claimed is:

1. A method, comprising:
   receiving, via a server system, a request from a user, associated with a user account, to upload content to the server system;
   identifying, via the upload request, information associated with the user account;
   comparing, via the server system, the information associated with the user account to information associated with previously identified user accounts;

identifying, via the server system, and based on the comparing, the user account as a banned account if a threshold amount of the information associated with the user account matches information associated with a previously identified banned account, wherein, if the user account is identified as a banned account, then the request to upload content is denied, and if the user account is not identified as a banned account, then the method further comprises:

obtaining by a server system, content-related information associated with the user, wherein the content-related information comprises data relating to at least one of content generation or upload activities by the user, and wherein at least a portion of the content-related information is different than the information associated with the user account;

identifying, via the server system, whether the user is granted permission to upload content for distribution or download, via the server system, the identifying comprising:

correlating the at least one of content generation or upload activities by the user with at least one of content generation or upload activities performed by a plurality of previously classified users that have previously provided content and are different than the user, and rejecting or accepting, via the server system, a content upload request received from the user based on the identifying whether the user is granted permission to upload content.

2. The method of claim 1, wherein the content-related information comprises one or more of:

data relating to classification of content associated with the user as violating one or more applicable content distribution policies, data relating to banning of content associated with the user by one or more other users, data relating to the user or to activities of the user associated with generation or publishing of content, data relating to one or more accounts associated with the user used in generating or publishing of content, data relating to identification of other accounts associated with the user, or market related data pertaining to content associated with the user.

3. The method of claim 1, wherein the information associated with the user account comprises at least one of:

a user name, a user identifier name or icon, information relating to a website used in interacting with the server or publishing of content, or an Internet Protocol (IP) address.

4. The method of claim 1, comprising:

evaluating at least one of current content generation or current download activities associated with the user based on determining whether the at least one of current content generation or current download activities meet a user classification criteria or threshold.

5. The method of claim 1, comprising:

evaluating at least one of current content generation or current download activities associated with the user based on at least one of a total number of submitted content, a total number of accepted content, or a total number of rejected content.

6. The method of claim 1, wherein the content comprises one or more applications configured for at least one of download to, or use in, an electronic device.

7. The method of claim 6, wherein the electronic device comprises a smartphone or a tablet.

8. The method of claim 1, wherein the identifying the user account as a banned account further comprises:

identifying the user account as associated with a user engaged in providing restricted content or malicious code.

9. The method of claim 1, wherein the plurality of previously classified users are identified by evaluating at least one of current content generation or current download activities associated with the developer of current content or content to be downloaded.

10. The method of claim 1, wherein the user account and an account associated with at least one previously classified user are separate user accounts of a single entity.

11. A system, comprising:

a server system to:

receive a request from a user, associated with a user account, to upload content to the server system;

identify information associated with the user account;

compare the information associated with the user account to information associated with previously identified user accounts;

identify, based on the comparing, the user account as a banned account if a threshold amount of the information associated with the user account matches information associated with a previously identified banned account, wherein, if the user account is identified as a banned account, then the request to upload content is denied, and if the user account is not identified as a banned account, then the server system further is to:

obtain content-related information associated with the user, wherein the content-related information comprises data relating to at least one of content generation or upload activities by the user, and wherein at least a portion of the content-related information is different than the information associated with the user account;

identify whether the user is granted permission to upload content for distribution or download, via the server system, wherein, when the server system is to identify whether the user is granted permission to upload content for distribution or download, the server system is to:

correlate the at least one of content generation or upload activities by the user with at least one of content generation or upload activities performed by a plurality of previously classified users that have previously provided content and are different than the user, and reject or accept a content upload request received from the user based on the identifying whether the user is granted permission to upload content.

12. The system of claim 11, wherein the content-related information comprises:

data relating to classification of content associated with user as violating one or more applicable content distribution policies, data relating to banning of content associated with the user by one or more other users, data relating to the user or to activities of the user associated with generation or publishing of content, data relating to one or more accounts associated with the user used in generating or publishing content, data relating to identification of other accounts associated with the user, and/or market related data pertaining to content associated with the user.

13. The system of claim 11, wherein the information associated with the user account comprises at least one of:

a user name, a user identifier name or icon, information relating to a website used in interacting with the server or publishing of content, or an Internet Protocol (IP) address.

14. The system of claim 11, wherein the server system is configured to:
    evaluate at least one of current content generation or current download activities associated with the user based on determining whether the at least one of current content generation or current download activities meet a user classification criteria or threshold.

15. The system of claim 11, wherein the server system is configured to:
    evaluate at least one of current content generation or current download activities associated with the user based on at least one of a total number of submitted content, a total number of accepted content, or a total number of rejected content.

16. The system of claim 11, wherein the content comprises one or more applications configured for at least one of download to, or use in, an electronic device.

17. The system of claim 16, wherein the electronic device comprises a smartphone or a tablet.

18. The system of claim 11, wherein the user account and an account associated with at least one previously classified user are separate user accounts of a single entity.

* * * * *